No. 775,662. PATENTED NOV. 22, 1904.
W. I. LYON.
DETACHABLE HANDLE.
APPLICATION FILED MAY 28, 1904.
NO MODEL.
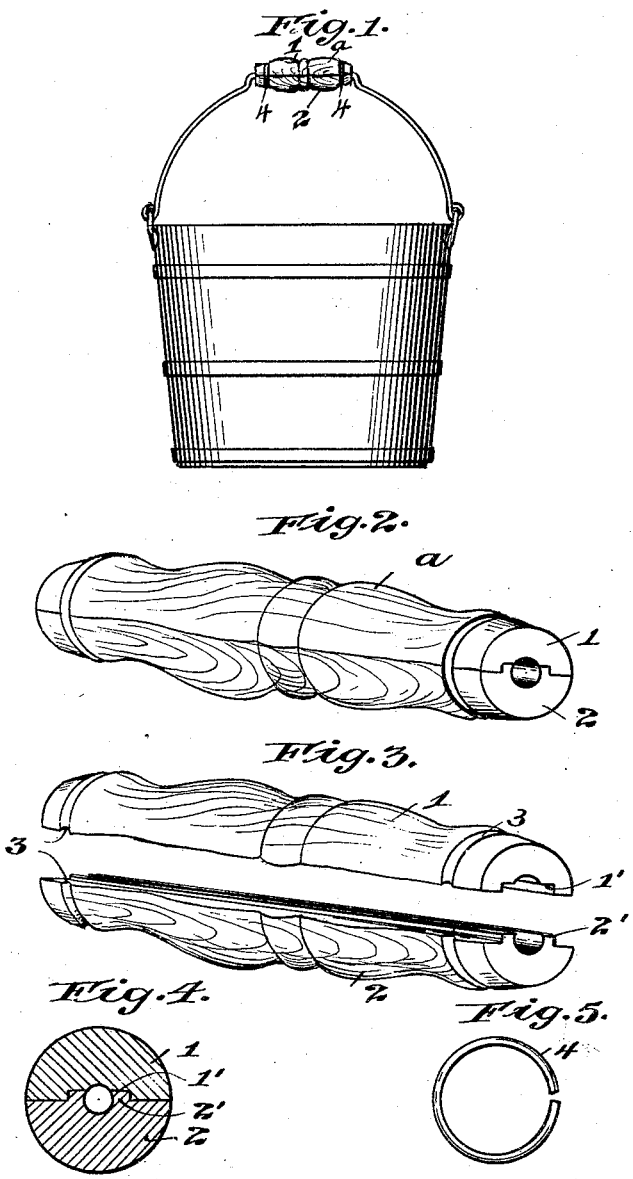
Witnesses,
Inventor,
William I. Lyon
By Offield, Towle & Linthicum
Attys.

No. 775,662.                                        Patented November 22, 1904.

UNITED STATES PATENT OFFICE.

WILLIAM I. LYON, OF WAUKEGAN, ILLINOIS.

DETACHABLE HANDLE.

SPECIFICATION forming part of Letters Patent No. 775,662, dated November 22, 1904.

Application filed May 28, 1904. Serial No. 210,313. (No model.)

*To all whom it may concern:*

Be it known that I, WILLIAM I. LYON, a citizen of the United States, residing at Waukegan, in the county of Lake and State of Illinois, have invented certain new and useful Improvements in Detachable Handles, of which the following is a specification.

This invention relates to detachable handles, and more particularly to a detachable handpiece for the bails of buckets, tubs, and other domestic utensils or for the wrapping-cord of a package or the like, and has among its salient objects to provide a handle of the character referred to which can be readily attached to a bail of a bucket or the like without detaching said bail to pass it through the handle endwise, to provide a handle the parts of which when in use are rigid against lateral and longitudinal movement relative to each other, and in general to provide a cheap, simple, and practicable device of the character referred to.

The invention will be readily understood from the following description, reference being had to the accompanying drawings, illustrating one embodiment of the invention, and in which—

Figure 1 is an elevation of a pail, showing the handle applied to the bail thereof. Fig. 2 is a full-sized perspective view of the invention. Fig. 3 is a similar view with the parts separated. Fig. 4 is a transverse sectional view through the body of the handle, and Fig. 5 is an elevation of a clamping-ring for holding the parts together.

Referring to the drawings, A designates as a whole the body of the handle or handpiece constituting the invention and comprises two sections 1 and 2, which when clamped together have the appearance of the ordinary handpiece commonly used. Each end thereof is slightly tapered, as shown in the drawings, and is provided with a circumferentially-extending groove or seat 3, into which is adapted to be fitted a split steel ring 4 for holding the parts or sections tightly together. Said rings are of such size and the grooves or seats are of such depth that when the rings are forced over the tapered ends of the handle they snap into the grooves and form a perfectly smooth surface around the ends of the handle.

In order to prevent relative lateral movement of the sections upon each other, the meeting faces thereof are provided with interfitting portions 1' and 2', clearly indicated in the drawings. It is understood, of course, that the body is provided with the usual axial bore to receive the bail or cord to which the handle is attached.

With the meeting faces provided with the interfitting portions which prevent lateral movement of the sections and the rings fitting snugly into the grooves and surrounding the sections, thus preventing longitudinal movement thereof relatively, it is seen that a very cheap, simple, and effective handle is provided which can be readily substituted for the broken or damaged handle on the utensil in use or that the handle can be removed from a utensil which has served its usefulness and applied to another.

It is obvious that alterations and modifications can be made in the details of construction and arrangement, and I do not, therefore, limit the invention to these details, except in so far as they are made the subject-matter of specific claims.

I claim—

1. A detachable handle comprising a body provided with an axial bore and sectioned longitudinally, interfitting members upon the meeting faces of said sections to prevent relative lateral movement thereof, circumferentially-extending grooves around said body, and split steel rings removably seated in said grooves and surrounding said handle, for the purpose described.

2. A detachable handle comprising a body provided with an axial bore and sectioned longitudinally, interfitting members formed integrally upon the meeting faces of said sections to prevent relative lateral movement thereof, circumferentially-extending grooves around said body, and a pair of split steel rings removably seated in said grooves and surrounding said handle, for the purpose described.

3. A detachable handle comprising a pair of interfitting members provided with an axial bore, circumferentially-extending grooves surrounding said members, said members being provided with tapering ends extending to said grooves, and a pair of split steel rings adapted to be forced over the ends of said members into said grooves, substantially as and for the purpose set forth.

4. A detachable handle comprising a body provided with an axial bore and sectioned longitudinally, each end of said handle being tapered and terminating in a circumferentially-extending groove, and a split steel ring adapted to be forced over the tapered end of said body into said groove, substantially as and for the purpose described.

5. A detachable handle, comprising a body provided with an axial bore and sectioned longitudinally, a circumferential ring-seat formed upon each end of said handle, and split spring-metal rings adapted to be forced over the ends of said body and seated in said seats, as and for the purpose described.

WILLIAM I. LYON.

Witnesses:
MARY C. LYON,
FRED A. DURST.